Patented Aug. 1, 1933

1,920,736

UNITED STATES PATENT OFFICE 1,920,736

PROCESS OF CARRYING OUT FERMENTATIONS AND SIMILAR BIOCHEMICAL REACTIONS BY MEANS OF BACTERIA

Stefan Bakonyi, Dessau, Germany, assignor to Deutsche Hydrierwerke A.-G., Berlin-Charlottenburg, Germany, a Corporation of Germany No Drawing. Application January 31, 1929, Serial No. 336,668, and in Germany August 3, 1928

10 Claims. (Cl. 195—20)

The present invention relates to a method of carrying out fermentations and similar biochemical reactions by means of bacteria. More specifically, the present invention relates to a method for the bacterial fermentation of carbohydrate materials which contain anti-fermentative substances.

In the past, the fermentation of carbohydrate mashes has been effected in a manner whereby a small quantity of mash is inoculated and a rapid increase in the number of bacteria is obtained, and this mash is then added to the main mash to bring about a rapid fermentation of the latter. However, according to this procedure the inoculation mash and the main mash are of the same composition and concentration and it has not been found possible to ferment completely mashes containing 5 to 10% carbohydrate (e. g., 10–20% molasses) if the carbohydrate material contains anti-fermentative substances. For example, difficulties have been encountered in attempting to ferment high concentrations of strongly caramelized molasses, sulphite liquor or other crude carbohydrates containing anti-fermentative substances, unless such materials are subjected to an expensive refining process.

In order to avoid the difficulties in question, it has been proposed to reduce the concentration of the mash to 2–3% carbohydrate. For example, in U. S. Patent 1,655,435 a concentration of 5 kilograms of molasses per 100 liters of mash is recommended. However, such a procedure is obviously uneconomical since extremely dilute solutions of the fermentation products must be subjected to distillation in order to recover the products. It has also been suggested to add expensive nutrients such as albuminous substances, but this procedure is likewise uneconomical.

It has now been found that a substantially complete fermentation of mashes containing high concentrations of crude carbohydrate materials can be obtained without previous elimination of anti-fermentative substances and without the addition of further nutrients by following the method hereinafter described.

According to the present invention the fermentation vessel is nearly completely filled with a dilute mash of a crude carbohydrate material. A mash of 1–3% carbohydrate (e. g., 2–6% molasses) has been found to be eminently suited for this purpose. This mash is then inoculated and after fermentation has become active, the remainder of the carbohydrate material is gradually added in the form of a highly concentrated mash. The mash to be added may be of concentrations of 25–50% carbohydrate (e. g., 50–100% molasses) and the amount added may be such that the total carbohydrate amounts to 5–10% of the total volume of the mash. According to this method the volume of the mash in the fermentation vessel is not appreciably increased since the concentrated carbohydrate solutions contract on dilution and since the volume of the mash is continuously decreasing owing to the constant evolution of gas.

In the case of carbohydrate materials which are lacking in phosphates and lime, for example certain types of molasses, it may be advisable to add small quantities of these materials. In such cases an addition of 0.25% of the weight of the molasses will usually be found to be satisfactory.

According to the above method it is possible to obtain growth and multiplication of the bacteria even though the carbohydrate materials contain anti-fermentative substances, since by the gradual increase in concentration of the crude material an assimilation takes place in such a way that the bacteria remain resistant and active in spite of the high final concentration of the anti-fermentative substances. In the prior art processes, on the other hand, the high initial concentration of mashes containing anti-fermentative substances entails weakening or killing of the bacteria.

The present invention may best be illustrated by the following specific example: 4000 kilograms of molasses and 5 kilograms of superphosphate are dissolved in about 60,000 liters of hot water. After heating to 100° and rapidly cooling to 37° C., this mash is inoculated with a strongly fermenting dilute corn or potato mash. Fermentation begins at once and becomes most active after a preliminary period of 8 to 16 hours. At this point the addition of more concentrated mashes is commenced. A mash comprising 8000 kg. molasses and 10 kg. of superphosphate dissolved in 8000 liters of water is gradually added during the next 10 to 24 hours so that the final volume of mash amounts to 80,000 liters. The active fermentation taking place in the dilute mash is not checked by the further addition of carbohydrate nor by the increase in the concentration of anti-fermentative substances and the fermentation is completed after about 40 hours.

It is to be understood that the present invention is not to be limited to any particular types of mashes or bacteria. While the process of this invention is most applicable to mashes containing anti-fermentative substances, improved results may also be obtained with mashes containing relatively small amounts of such substances. In all cases it has been found possible to ferment higher concentrations of carbohydrates and to secure more rapid fermentations by following the method of this invention.

The invention now having been described, what is claimed is:

1. A process for the bacterial fermentation of crude carbohydrate materials containing anti-fermentative substances which comprises inoculating a dilute mash of said crude carbohydrate and after fermentation has become active, adding the remainder of the crude carbohydrate at intervals in the form of small additions of concentrated mash.

2. A process for the bacterial fermentation of crude carbohydrate materials containing anti-fermentative substances which comprises inoculating a mash containing 1–3% of said crude carbohydrate and after fermentation has become active, adding the remainder of the crude carbohydrate at intervals in the form of small additions of mash containing 25–50% of said crude carbohydrate.

3. A process for the bacterial fermentation of molasses containing anti-fermentative substances which comprises inoculating a dilute mash of said molasses and after fermentation has become active, adding the remainder of the molasses at intervals in the form of small additions of a concentrated mash of said molasses.

4. A process for the bacterial fermentation of molasses containing anti-fermentative substances which comprises inoculating a mash containing 2–6% of said molasses and after fermentation has become active, adding the remainder of the molasses at intervals in the form of small additions of a mash containing 50–100% of said molasses.

5. A process for the bacterial fermentation of crude carbohydrate materials containing anti-fermentative substances which comprises inoculating a dilute mash of said crude carbohydrate and after fermentation has become active, gradually adding over an extended period of time the remainder of the crude carbohydrate in the form of a concentrated mash.

6. A process for the bacterial fermentation of crude carbohydrate materials containing anti-fermentative substances which comprises inoculating a mash containing 1–3% of said crude carbohydrate and after fermentation has become active, gradually adding over an extended period of time the remainder of the crude carbohydrate in the form of a mash containing 25–50% of said crude carbohydrate.

7. A process for the bacterial fermentation of molasses containing anti-fermentative substances which comprises inoculating a dilute mash of said molasses and after fermentation has become active, gradually adding over a period of time constituting the major remaining part of the normal fermentation period the remainder of the molasses in the form of a concentrated mash.

8. A process for the bacterial fermentation of molasses containing anti-fermentative substances which comprises inoculating a mash containing 2–6% of said molasses and after fermentation has become active, gradually adding the remainder of the molasses in the form of a mash containing 50–100% of said molasses at such a rate that the total fermentable carbohydrate in the mash does not from time to time materially exceed approximately 5–10% of the total volume of the mash.

9. In a process for the bacterial fermentation of crude carbohydrate materials containing anti-fermentative substances in which a concentrated mash is added to an actively fermenting dilute mash, the step which comprises adding the concentrated mash at intervals in amounts sufficiently small so that the amount of anti-fermentative substances added at one time will have no marked inhibitory effect upon the fermentation.

10. In a process for the bacterial fermentation of molasses containing anti-fermentative substances in which a concentrated mash of said molasses is added to an actively fermenting dilute mash, the step which comprises adding the concentrated mash at intervals in amounts sufficiently small so that the amount of anti-fermentative substances added at one time will have no marked inhibitory effect upon the fermentation.

STEFAN BAKONYI.